(12) United States Patent
Nener et al.

(10) Patent No.: US 6,329,075 B1
(45) Date of Patent: Dec. 11, 2001

(54) ELECTRICAL CONDUCTIVITY AND HIGH STRENGTH ALUMINUM ALLOY COMPOSITE MATERIAL AND METHODS OF MANUFACTURING AND USE

(75) Inventors: Ralph M. Nener, D'Urfe (CA); Scott W. Haller, Richmond, VA (US)

(73) Assignee: Reycan, L.P., Quebec (CA)

( * ) Notice: Subject to any disclaimer, the term of this patent is extended or adjusted under 35 U.S.C. 154(b) by 0 days.

(21) Appl. No.: 09/497,167

(22) Filed: Feb. 3, 2000

(51) Int. Cl.$^7$ ................ B32B 15/01; B05D 1/00
(52) U.S. Cl. ............ 428/654; 148/523; 148/528; 148/535; 165/177; 165/182; 165/905; 228/101; 427/436; 428/607; 428/636; 428/925; 428/937; 428/938; 428/939
(58) Field of Search .................. 428/607, 636, 428/654, 925, 937, 938, 939; 427/431, 436; 148/523, 528, 535; 165/177, 182, 905; 228/101

(56) References Cited

U.S. PATENT DOCUMENTS

| | | |
|---|---|---|
| Re. 30,465 | 12/1980 | Schoerner . |
| 3,914,009 | 10/1975 | Chia et al. . |
| 3,958,987 | 5/1976 | Chia et al. . |
| 4,010,315 | 3/1977 | Mildner . |
| 4,028,141 | 6/1977 | Chia et al. . |
| 4,121,951 | 10/1978 | Fortin et al. . |
| 4,560,625 | * 12/1985 | Kaifu et al. ............. 428/654 |
| 4,752,334 | 6/1988 | Nadkarni et al. . |
| 5,148,862 | 9/1992 | Hashiura et al. . |
| 5,217,547 | 6/1993 | Ishikawa et al. . |

* cited by examiner

*Primary Examiner*—Robert R. Koehler
(74) *Attorney, Agent, or Firm*—Stevens, Davis, Miller & Mosher, LLP

(57) ABSTRACT

An aluminum alloy composite material includes a higher strength aluminum alloy core material layer and at least one cladding aluminum alloy material layer having a higher electrical conductivity than the core material. The cladding layer is positioned adjacent to the core and the composite is adapted for particular application in heat exchangers where brazing is conducted under controlled atmospheres with special flux materials. The core material has an electrical conductivity less than 50% IACS and the cladding layer has an electrical conductivity greater than 50% IACS. The cladding layer can be on one or both surfaces of the core layer. The thickness of the cladding layer can range between about 2.5 and 40% of the overall composite thickness depending on whether one or more cladding layers are employed. The cladding layer also has a corrosion potential more negative than the core layer for enhanced corrosion resistance.

21 Claims, 2 Drawing Sheets

ELECTRICAL CONDUCTIVITY AND HIGH STRENGTH ALUMINUM ALLOY COMPOSITE MATERIAL AND METHODS OF MANUFACTURING AND USE

FIELD OF THE INVENTION

The present invention is directed to an aluminum alloy composite material having improved electrical conductivity, corrosion resistance, and high strength, and methods of manufacturing and use, and in particular to a composite material combining a core material of high strength and one or more cladding layers having an electrical conductivity greater than the core material for improved performance in heat exchanger applications.

BACKGROUND ART

In the prior art, aluminum alloys are the alloys of choice for heat exchanger applications. These alloys are selected for their desirable combination of strength, low weight, good thermal and electrical conductivity, brazeability, corrosion resistance, and formability.

Typical applications include automotive heater cores, radiators, evaporators, condensers, charge air coolers, and transmission/engine oil coolers. One particular application that requires a good combination of properties is fin stock for radiators. In these applications, the fin stock is arranged between stacked tubing that carries the radiator cooling media. The tubing is situated between headers which redirect the cooling media flow between layers of tubing and which also can contain the radiator inlets and outlets. Typically, the tubes are clad with a brazing material and the entire assembly is brazed together in a controlled atmosphere braze (CAB) process using a brazing flux.

The trend in the heat exchanger industry is to continually downsize components. This downsizing requires new demands on the heat exchanger materials in terms of properties and performance capabilities. Such demands are recognized in U.S. Pat. No. 5,217,547 to Ishikawa et al. This patent notes the desire for making fin stock of thinner gauge to meet the demands of higher performance and increased compactness for heat exchangers. While thinner gauge may result in lighter weight heat exchangers it can also result in lower strength, particularly as a result of the brazing process wherein the heat exchanger may see temperatures of 600° C. These elevated temperatures can cause sagging during brazing, loss of fin integrity, and an unacceptable brazed product.

Ishikawa et al. attempt to overcome this problem by exotic alloying of an aluminum alloy typically used in fin stock application, i.e., AA3003. To provide high temperature deformation and sagging resistance, Ishikawa et al. teach an aluminum alloy for fin stock with particular levels of iron, silicon, zirconium, zinc, tin, and indium. The drawback to these remedies is that often times these exotic alloys can be difficult to manufacture, thereby greatly increasing the cost of the fin stock material.

Another apparent solution to the problem of decreasing the thickness of fin stock material is to employ a higher strength aluminum alloy material. While employing a higher strength material may offer benefits in terms of increased sagging and high temperature deformation resistance, these higher strength materials are problematic in the brazing sequence of heat exchanger manufacture.

An often-used brazing process for heat exchanger manufacture is the CAB process employing a Nocolok® flux. This flux is a non-corrosive flux made up of a mixture of potassium and fluoro-aluminates. The flux functions at brazing temperatures by melting, spreading and dissolving the oxide film. Certain alloying elements often found in higher strength aluminum alloys, e.g., magnesium, can be detrimental to the brazing process, including adversely interacting with the fluxes used during brazing. Consequently, while employing a higher strength aluminum alloy may solve the sagging problem during brazing, other problems may crop up due to the incompatibility between the alloy itself and the brazing process.

Another problem in the prior art is the need for heat exchanger materials, e.g., fin stock, to have certain levels of post-braze tensile strength and electrical conductivity to meet customer's specifications. It is difficult to meet specifications that combine both higher levels of strength and electrical conductivity with presently available materials at reasonable costs. Aluminum alloys having high strength will have lower electrical conductivities and cannot meet such specifications. Similarly, aluminum alloys with high electrical conductivities will have insufficient strength to meet such a specification. While exotic alloys may offer a limited solution to this dilemma, costs to make such alloys make this solution undesirable for many manufacturers.

Accordingly, a need has developed to provide an improved material for heat exchanger use that overcomes the drawbacks to the prior art solutions noted above. The present invention solves this need by providing an aluminum alloy composite material made up of a high electrical conductivity cladding layer and a lower electrical conductivity core. The composite material exhibits high post-braze strength, improved post-braze electrical/thermal conductivity, excellent corrosion resistance, and brazeability in brazing processes such as CAB. The material is ideal as bare fin stock to be brazed to braze clad tubing for heat exchanger applications.

The use of composite materials made of aluminum has found application in cable shielding. U.S. Pat. No. 4,010,315 to Mildner discloses a cable shielding tape, which has a first layer of substantially pure aluminum bonded to a second layer of an aluminum alloy. While Mildner may disclose a composite material, this patent is not concerned with the brazing problems faced by the prior art nor does this patent suggest any type of a solution to such problems. Other composite materials have been proposed as in U.S. Pat. No. 4,146,164 to Anderson and U.S. Pat. No. 5,011,547 to Fujimoto et al. However, these patents are primarily directed at braze clad materials, not bare fin stock material and the like as is the present invention.

SUMMARY OF THE INVENTION

Accordingly, it is a first object of the present invention to provide an aluminum alloy composite that is ideally suited for use in heat exchanger applications.

Another object of the present invention is a method of manufacturing an aluminum alloy composite for use in heat exchanger applications.

A still further object of the present invention is an improved method of brazing which utilizes a composite material employing aluminum alloying materials.

One other object of the present invention is an aluminum alloy composite that provides a heat exchanger material with improved electrical/thermal conductivity, sagging resistance, high strength, excellent corrosion resistance, and good brazeability.

Yet another object of the invention is bare fin stock as the aluminum alloy composite, the bare fin stock to be brazed onto braze clad tubing as part of a heat exchanger, and a method of making such a heat exchanger using the inventive composite.

Other objects and advantages of the present invention will become apparent as a description thereof proceeds.

In satisfaction of the foregoing objects and advantages, the present invention provides a novel aluminum alloy composite material, its method of manufacturing and its method of use in brazing. The composite material further comprises a core layer having opposing core surfaces. The core layer is formed from a first aluminum alloy material having less than 99% by weight of aluminum and more than 1% by weight of one or more metallic elements. The one or more metallic elements can be in or out of solution and increase the strength of the first aluminum alloy material such that the first aluminum alloy material has a tensile strength greater than 15 KSI. The core material also has an electrical conductivity less than 50% IACS.

The composite also comprises at least one cladding layer having opposing surfaces, one of the opposing surfaces adjacent one the opposing core surfaces, with at least a portion of the other opposing surfaces exposed for fusing, e.g., brazing, with another aluminum component. The at least one cladding layer is formed of a second aluminum alloy material having less than 1% by weight of the one or more metallic elements such that the second aluminum alloy material has a tensile strength less than 15 KSI. The cladding material may also have from zero to up to 2.5% by weight of other metallic elements that are in solution and increase corrosion potential negativity so that the corrosion potential of the second aluminum alloy material is at least 20 mV more negative than a corrosion potential of the first aluminum alloy material of the core layer. The cladding layer has an electrical conductivity greater than 50% IACS.

Based on the above definitions, the core layer can be formed from a first aluminum alloy material selected from the group consisting of AA2000 series, AA3000 series, AA5000 series, AA6000 series, AA7000 series, and AA8000 series aluminum alloys. The at least one cladding layer can be formed of a second aluminum alloy material selected from the group consisting of AA1000 series, AA7000 series, and AA8000 series aluminum alloys. As noted above, the cladding layer should have a tensile strength of less than 15 KSI (103.4 MPa), and a corrosion potential of about at least 20 mV more negative than the core layer for enhanced corrosion resistance.

In a preferred mode, the core layer is formed of one of an AA3000 series, an AA6000 series, and an AA8000 series aluminum alloy and the cladding layer is formed of one of an AA1000 series and an AA7000 series aluminum alloy. The at least one cladding layer can comprise two cladding layers, each cladding layer being adjacent a respective opposing surface of the core layer. More preferably, the core layer is an AA3000 type aluminum alloy and the cladding layer is an AA1000 type aluminum alloy. Preferably, the tensile strength of the core layer is greater than 20 KSI (137.9 MPa). The corrosion potential of the cladding layer is preferably at least 50 mV more negative than the core layer.

The composite material can take on any shape, including sheet for fin stock, tubing, and the like. Preferably, the thickness of each cladding layer is between about 5 and 40% of the overall thickness of the composite when employing one cladding layer and between about 2.5 and 20% of the overall thickness when a pair of cladding layers is employed.

The invention also includes a method of brazing using the inventive composite material. In this mode, one or more cladding layer(s) of the composite material are joined to one or more aluminum alloy components to form a brazed article such as a heat exchanger. The brazing process can be any conventional type, including those utilizing controlled atmospheres and special fluxes, vacuum brazing, and the like.

The invention also includes a method of manufacturing the composite material by adhering, layering, bonding, or joining the two materials together. The composite material can be formed by roll bonding sheet or strip material that has been either formed by continuous casting alone, continuous casting and working, and ingot casting and working, such processing also including the requisite heat treating/ annealing steps. Other methods of manufacture can also be employed wherein one layer is deposited or applied to another layer. Examples of these techniques include spraying molten or solid materials onto a substrate of the core material and the like.

The invention also encompasses a brazed article having the composite material as a component thereof with the higher electrical conductivity-cladding layer being joined to another component part of the article as a result of the brazing process.

In a preferred embodiment, the inventive composite material is a heat exchanger bare fin stock that is adapted to be brazed to a braze clad tubing. The properties of the inventive composite combine corrosion resistance, strength, and electrical conductivity to meet stringent specifications for heat exchanger applications requiring extremely light gauge fin stock and tubing.

BRIEF DESCRIPTION OF THE DRAWINGS

Reference is now made to the drawings of the invention wherein.

DESCRIPTION OF THE PREFERRED EMBODIMENTS

Figure 1:
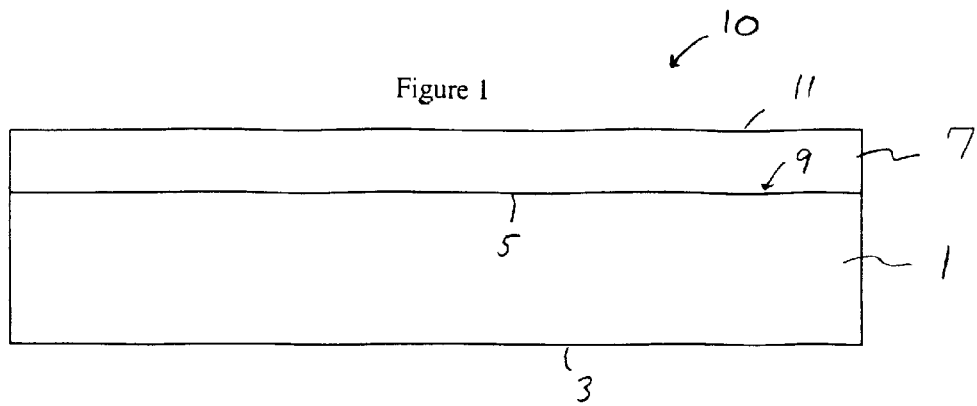
FIG. 1 shows a first embodiment of the invention.

The invention offers significant advancements in the field of brazing aluminum alloys together by combining an aluminum alloy of high electrical conductivity and relatively low strength with an aluminum alloy of lower electrical conductivity and higher strength as a composite material for improved brazeability, thermal conductivity, excellent corrosion resistance, and high overall electrical conductivity. The high electrical conductivity material is a cladding layer that covers or is adjacent at least one surface of the lower electrical conductivity core material layer. The electrical conductivity of the cladding material is greater than 50% IACS and the electrical conductivity of the higher strength core layer material is less than 50% IACS. By combining the cladding layer and the core layer, a composite material is formed which utilizes the attributes of the higher strength material for improved resistance to high temperature deformation and sagging. At the same time, the brazing process is not compromised due to incompatibilities between brazing process variables and the alloying content of the high strength core aluminum alloy material. More preferred levels of electrical conductivity for the cladding material are greater than about 55% IACS.

The high strength low electrical conductivity core layer can be defined in terms of the metallic additions made to pure aluminum. These high strength core materials can be defined as those containing significant amounts of metallic elemental additions such as but not limited to Cr, Cu, Fe, Mg, Mn, Ni, Co, Si, Li, Ti, V, Zr, and Zn. These additions, either individually or in combination increase the strength of the alloy, when in and out of solution, such that the purity level of the alloy is less than 99% by weight of aluminum. In other words, the core material has more than 1% by weight of one or more of these metallic elements to contribute to strength increases such that the tensile strength exceeds 15 KSI.

In the same fashion, the low strength high electrical conductivity cladding material are generally defined as those alloys having purity levels in excess of 99% by weight of aluminum. However, the cladding layer can contain metallic additions from zero to 2.5% by weight of such elements that make the corrosion potential of the alloy less noble (more negative) and are maintained in solution so as to not significantly reduce the electrical conductivity. Examples of such elements include Ga, In, and Zn. In other words, the cladding layer has less than 1% by weight of the strengthening elements found in the core layer but may have up to 2.5% of metallic elements that are generally in solution and make the corrosion potential of the cladding layer more negative, preferably 20 mV more negative than the core layer. Without the strengthening metallic elements found in the core layer, the cladding layer's tensile strength is less than 15 KSI.

The composite alloy of the invention provides for a post-braze electrical conductivity that is at least 2% IACS greater than the electrical conductivity of the core. The reduction in post-braze strength of the composite is less than 20% of the post-braze strength of the core alloy. The composite can be defined in terms of the following:

A=Post-braze tensile strength of the core
B=electrical conductivity of the core
C=Post-braze tensile strength of the composite
D=electrical conductivity of the composite, wherein
D−B>2%IACS and A−C/C×100<20%

Based on the definitions above, the high electrical conductivity cladding material can be selected from the group of Aluminum Association aluminum alloy series AA1000, AA7000, and AA8000. The high strength, lower electrical conductivity core material can be chosen from the group of AA2000, AA3000, AA5000, AA6000, AA7000, and AA8000 series aluminum alloys, providing of course that each alloy selected has the specified electrical conductivity. More preferred alloys include the AA1000 and AA7000 series alloys for the cladding material and AA3000, AA6000, and AA8000 series aluminum alloys for the core materials. Even more preferred alloys are AA1000 for the cladding material and either an AA3000 series or AA6000 series alloy for the core material. Specific examples for the core layer include AA3003 and AA6061.

Mechanical properties can also be used in conjunction with the electrical conductivities noted above to distinguish the core and cladding layer materials. The core layer should have a tensile strength greater than 15 KSI (103.4 MPa) and the cladding layer should have a tensile strength less than 15 KSI (103.4 MPa). For some applications, alloys having minimum strength values, e.g., more than about 20 KSI tensile strength (137.9 MPa), are more preferred for use as the core layer than those with at least 15 KSI tensile strength (103.4 MPa).

For enhanced corrosion resistance, the cladding layer's corrosion potential should be at least 20 mV more negative than the core layer, preferably 50 mV more negative than the core layer. As will be shown below, controlling this corrosion potential difference vastly improves the corrosion resistance of the composite material, thus making it ideal for use in heat exchangers.

It should be understood that the selection of alloys in the various series of the Aluminum Association reflects the tensile strength, the desired electrical conductivities, and the corrosion potential for the core and cladding layer of the composite as described above. Alloys suitable for the invention may include compositions that would fall under a given specification for a certain type of alloy, e.g., AA3003 for the core, or may be a compositional hybrid of two or more alloys providing that the strength, corrosion potential and strength guidelines are met, e.g., a composition that may have traits of AA3000, AA7000, and AA8000 series alloys.

In one use, the inventive composite is ideally suited as a bare heat exchanger fin stock for use with braze clad tubing in a heat exchanger. The bare fin stock can be brazed to the braze clad tubing while still exhibiting an excellent combination of post-braze electrical conductivity, corrosion resistance, and strength. With this combination, the loss of fin integrity and/or column strength which prior art fin stock material can be subject to as a result of down-gauging is eliminated or reduced. Thus, the fin stock is less prone to failure due to the constant thermal and pressure cycling encountered when the heat exchanger is in use in a vehicle or other machinery. While other prior art fin stock may be capable of meeting the strength requirements for these types of applications, these prior art materials lack the necessary electrical conductivity needed for heat exchange and are not as suitable for heat exchanger use as the inventive composite.

FIG. 1 shows one embodiment of the inventive composite designated by the reference numeral 10. The composite includes a core layer 1 having opposing surfaces 3 and 5. One cladding layer 7 is shown with one of its surfaces 9 adjacent to the surface 5 of the core layer 1. Since the cladding layer surface 9 is adjacent to the core, an opposite layer 11 is bare or exposed for attachment to another component by a brazing operation. In the FIG. 1 embodiment, the thickness of the clad layer can be from 5 to 40% of the thickness of the entire composite, i.e., the combined thicknesses of the core and the cladding layer (the thickness or clad ratio). The overall thickness can vary depending on the particular application of the composite material. For example, for fin stock, the sheet thickness may vary between 0.002 inches (0.05 mm) and 0.006 inches (0.015 mm). Other component shapes such as tubing may have other thickness ranges. For example, sheet thickness for tubing may be 0.008 inches (0.203 mm).

Figure 2:
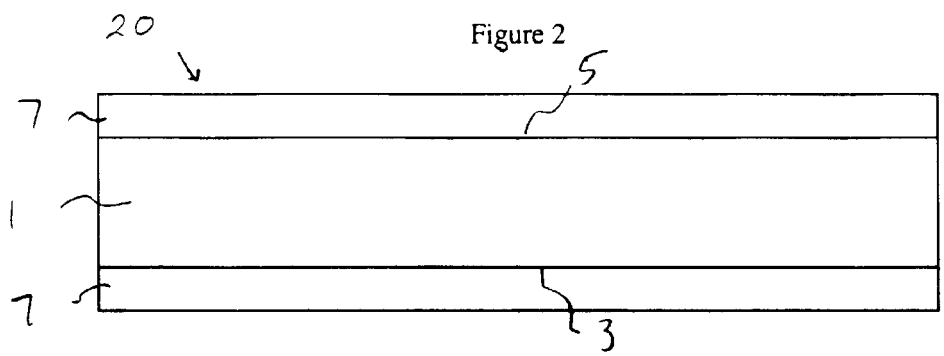
FIG. 2 shows a second embodiment of the invention.

FIG. 2 shows an alternative embodiment 20 wherein each of the surfaces 3 and 5 of the core are adjacent a cladding layer 7. In this embodiment, the thickness ratio of each cladding layer is in a preferred range of between about 2.5 and 20% of the overall thickness of the composite 20.

In FIGS. 1 and 2, the core layer 1 is described as being adjacent one of more cladding layers 7. Adjacent is intended to encompass all known methods of adhering, layering or joining the cladding layer/material to the core layer/material to form the illustrated composite structure. The term layered is intended to encompass the steps necessary to form the composite material from the core and cladding materials. Examples of such layering include roll bonding, wherein rolling forces are employed to attach existing layers together. Other forms of layering may include continuous casting wherein each layer is either cast or cast and worked to form the composite structure. Methods whereby one layer is formed and another formed thereon can also be utilized such as those available in the liquid and/or solid metal deposition art, e.g., thermal spraying, arc spraying, powder spraying. When starting with one layer, the one layer can be formed using conventional ingot or continuous casting techniques and conventional hot and/or cold rolling methods. The cladding material is then applied thereon to form the composite.

Figure 3:
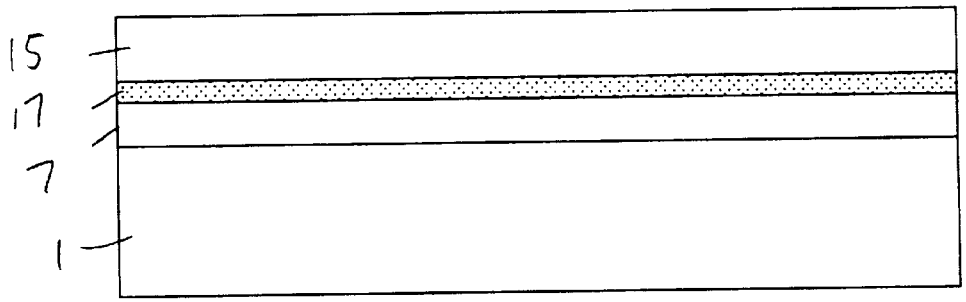
FIG. 3 shows the embodiment of FIG. 1 joined to another component to form a brazed article.

FIG. 3 shows the composite 10 of FIG. 1 brazed to another aluminum alloy component 15. The component can be braze clad if desired. In this figure, the brazed zone is identified by reference numeral 17. The brazing process can be any conventional brazing technique, including controlled atmosphere brazing (CAB) and vacuum brazing. A preferred technique is a controlled atmosphere brazing process, wherein the brazing is conducted under non-atmospheric conditions, e.g., a dry nitrogen atmosphere. These CAB processes are commonly employed for joining aluminum material and use elevated temperatures, e.g., 600° C., to form an effective brazed joint. During these types of brazing processes, a flux is employed to facilitate the brazing process. One such flux is a Nocolok® flux which can adversely interact with the material being brazed. By using the composite material of the invention, the alloying elements that are typically found in high strength aluminum alloys are separated from the flux. Consequently, a high strength aluminum alloy can be employed as a brazed article component without adversely affecting the brazing process. More particularly, the cladding layer 7 of FIG. 3 acts as a diffusion barrier to the core alloying elements that would otherwise degrade the brazing process by interaction with the flux.

The cladding layer 7 also functions as a diffusion barrier to molten braze material that would otherwise penetrate the core layer 1 during brazing thereof. Reducing the depth and/or amount of brazing material 17 penetration into the core layer 1 improves the high temperature sag and melt characteristics of the brazed article. Thus, the cladding layer 7, whether it encompasses the core layer 1 or is applied only to the surface thereof, preforms a dual diffusing barrier function role.

The renditions of FIGS. 1–3 show the various layers in sheet or strip form. However, the composite material can be made in any form, corrugated fin stock, tubing, headers, or any other shape that would be adapted for brazing.

Figure 4:
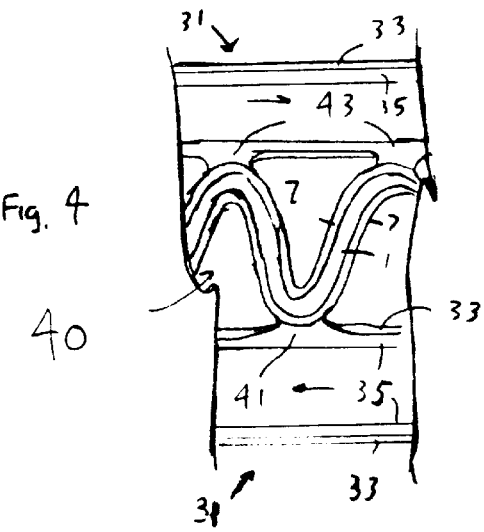
FIG. 4 shows the inventive composite of FIG. 2 as fin stock brazed to a braze clad tubing for heat exchanger application.

Referring to FIG. 4, the composite material is formed as corrugated bare fin stock sheet 40, the fin stock including the core layer 1 and the exposed and ready for brazing cladding layers 7. The exposed cladding layer 7 are brazed to a braze clad tubing 31 having a braze clad layer 33 on a core 35 using a brazing process such as CAB. The brazed areas 41 and 43 fuse the braze cladding 33 with the cladding layers 7 of the fin stock 40.

Although not shown, the tubing 31 and fin stock 30 would be part of a heat exchanger as is known in the art, see for example, U.S. Pat. No. 5,148,862, herein incorporated by reference. Since this construction is well known, a further illustration is not deemed necessary for understanding of the invention.

While FIG. 4 shows the FIG. 2 embodiment of the invention as bare fin stock, a corrugated bare fin stock having only one cladding layer 7 could be brazed to a braze clad material as well.

To demonstrate the unexpected improvements associated with the inventive composite, experimental studies were conducted comparing high strength materials and various materials according to the invention. In one test, the high strength material is similar to an AA3000 series aluminum alloy material and the inventive composite utilizes this high strength material as the core layer, X3, and an AA1100 material as the cladding layer. In another series of tests, the high strength materials included AA3000 and AA7000 series alloys as well as compositions meeting the definition of the core and cladding materials as defined above. The chemical compositions of the materials are depicted in Table 1.

TABLE 1

Chemical Composition (wt. %)*

| Alloy | Si | Fe | Cu | Mn | Mg | Ni | Zn | Zr |
|---|---|---|---|---|---|---|---|---|
| Core A | 1.00 | 0.20 | <0.01 | 1.58 | <0.01 | — | 2.03 | .10 |
| 1100 | .14 | .52 | 0.15 | 0.01 | <0.01 | — | 0.01 | — |
| Clad X | 0.15 | 0.50 | 0.15 | <0.01 | <0.01 | <0.01 | 1.2 | — |
| Clad Y | 0.03 | 0.15 | 0.05 | <0.01 | <0.01 | <0.01 | 0.80 | — |
| Core B | 1.03 | 1.02 | 0.15 | 0.50 | <0.01 | <0.01 | 1.06 | 0.12 |
| Core C | 0.75 | 0.98 | 0.15 | 0.26 | 0.14 | 0.81 | 1.02 | — |
| Core D | 0.74 | 0.98 | 0.52 | 0.26 | <0.01 | 0.50 | 1.03 | — |
| Core E | 0.72 | 1.00 | 0.66 | 0.58 | 0.15 | <0.01 | 0.51 | — |

*Balance aluminum and incidental impurities

In one series of tests, four materials were used for the study, one being the unclad Core A. The other three materials were clad materials as follows:

1) Core A clad on both surfaces with AA1100, the cladding ratio was 10% (the clad ratio is the thickness of the cladding divided by the thickness of the overall composite);

2) Core A clad on both surfaces with AA1100 at a clad ratio of 15%; and

3) Core A layer clad on one surface with AA1100 at a clad ratio of 30%.

The materials were produced using a laboratory cast DC ingot material for the core layer and a production cast DC ingot for the cladding layer. The core material and the cladding ingots were hot rolled to the appropriate bonding gauges and the composites were assembled using stainless steel wire. The composite was reheated at 900° F. (482° C.) and hot rolled to bond the cladding material to the core material. The hot line exit gauges of the composites were 0.35 inch (8.89 mm). The composites were cold rolled to an intermediate anneal gauge of 0.10 inches (0.254 mm) and batch annealed at 750° F. (399° C.) for 2 hours. The composites were then given a final cold reduction of 30% to a gauge of 0.007 inches (0.178 mm) to produce an –H1X temper fin material. Samples of the composites and an unclad X3 alloy fin stock processed according to the same –H1X temper practice were given a simulated braze cycle at 1100° F. (593° C.) and submitted for mechanical property and electrical conductivity evaluations. The results of these evaluations are shown in Table 2. As is evident from this Table, the inventive composite exhibits much improved electrical conductivity over the higher strength and unclad material, thus making it an ideal candidate for a brazeable heat exchanger material. The increase in post-braze electrical conductivity from 41.0% IACS to one of 43.0 and 44.0% IACS is a significant one since such an increase in electrical conductivity indicates that thermal conductivity is improved, thereby enhancing heat exchange.

TABLE 2

| Core Alloy | Cladding Alloy | Sides | Clad Ratio % | Post-Braze Tensile (MPa) | Post-Braze Elec. Cond. (% IACS) |
|---|---|---|---|---|---|
| X3 | None | None | None | 147 | 41.0 |
| X3 | 1100 | Two | 10 | 139 | 43.0 |
| X3 | 1100 | Two | 15 | 134 | 44.0 |
| X3 | 1100 | One | 30 | 132 | 44.0 |

Another series of tests was conducted following the experimental procedure noted above for Core A and AA1100 using other materials from Table 1. Table 3 shows the post-braze tensile and conductivity values for AA 1100, Clad X and Y, and the Cores B–E and how the various materials correlate to the definitions of core and cladding layers as set forth above. Table 3 shows that the clad materials have a tensile strength less than 15 KSI (103.4 MPa) and an electrical conductivity greater than 50% IACS while the core alloys all exceed 15 KSI (103.4 MPa) tensile strength and have conductivities less than 50% IACS.

TABLE 3

Separate Core and Cladding Layer Properties

| Alloy | Post-Braze Tensile Strength (MPa) | Post-Braze Cond. (% IACS) |
|---|---|---|
| 1100 | 90 | 58 |
| Clad X | 74 | 56 |
| Clad Y | 48 | 59 |
| Core B | 156 | 45 |
| Core C | 146 | 44 |
| Core D | 145 | 48 |
| Core E | 145 | 45 |

Table 4 shows the tensile and conductivities of the clad and core layers when formed into the inventive composite. As is evident from this Table, the post-braze composites combine excellent electrical conductivity with strength, thus making it very desirable for use where good conductivity and strength requirements are necessary, e.g., bare fin stock for heat exchanger use.

TABLE 4

Properties after Composite Manufacture

| Composite Material Designation | Core Type | Clad Type | Thickness Ratio % | Post-Braze Tensile MPa | Post-Braze Cond. % IACS | Post-Braze Grain size μ |
|---|---|---|---|---|---|---|
| Y/B | Core B | Clad Y | 15 | 121 | 49 | 635 |
| Y/B | Core B | Clad Y | 10 | 125 | 47 | 677 |
| Y/C | Core C | Clad Y | 15 | 121 | 48 | 203 |
| Y/C | Core C | Clad Y | 10 | 129 | 47 | 441 |
| X/D | Core D | Clad X | 15 | 125 | 50 | 597 |
| Y/D | Core D | Clad Y | 10 | 135 | 50 | 251 |
| X/E | Core E | Clad X | 15 | 123 | 47 | 535 |
| X/E | Core E | Clad X | 10 | 138 | 47 | 339 |

As noted above, corrosion resistance is a necessary characteristic of heat exchanger materials. Table 5 shows the corrosion potential of the materials tested and FIG. 5 graphically portrays the corrosion behavior in SWAAT testing. Since this type of testing under ASTM G85 is well recognized, a further description of the details of the actual testing is not believed necessary for understanding of the test results.

TABLE 5

ASTM G69 Electrochemical Corrosion Potentials

| Alloy | Corrosion Potential (mV vs. S.C.E. |
|---|---|
| 1100 | −746 |
| Clad X | −892 |
| Clad Y | −782 |
| Core A | −892 |
| Core B | −803 |
| Core C | −742 |
| Core D | −723 |
| Core E | −720 |

Table 5 shows that the materials AA1100, Clad X and Clad Y all have potentials that would be more negative by at least 20 mV than one of the Cores B–E. The high corrosion potential of Core A can be attributed to its high zinc amount and the corrosion performance of AA1100 clad on. Core A would not be expected to be any better than Core A itself.

Figure 5:
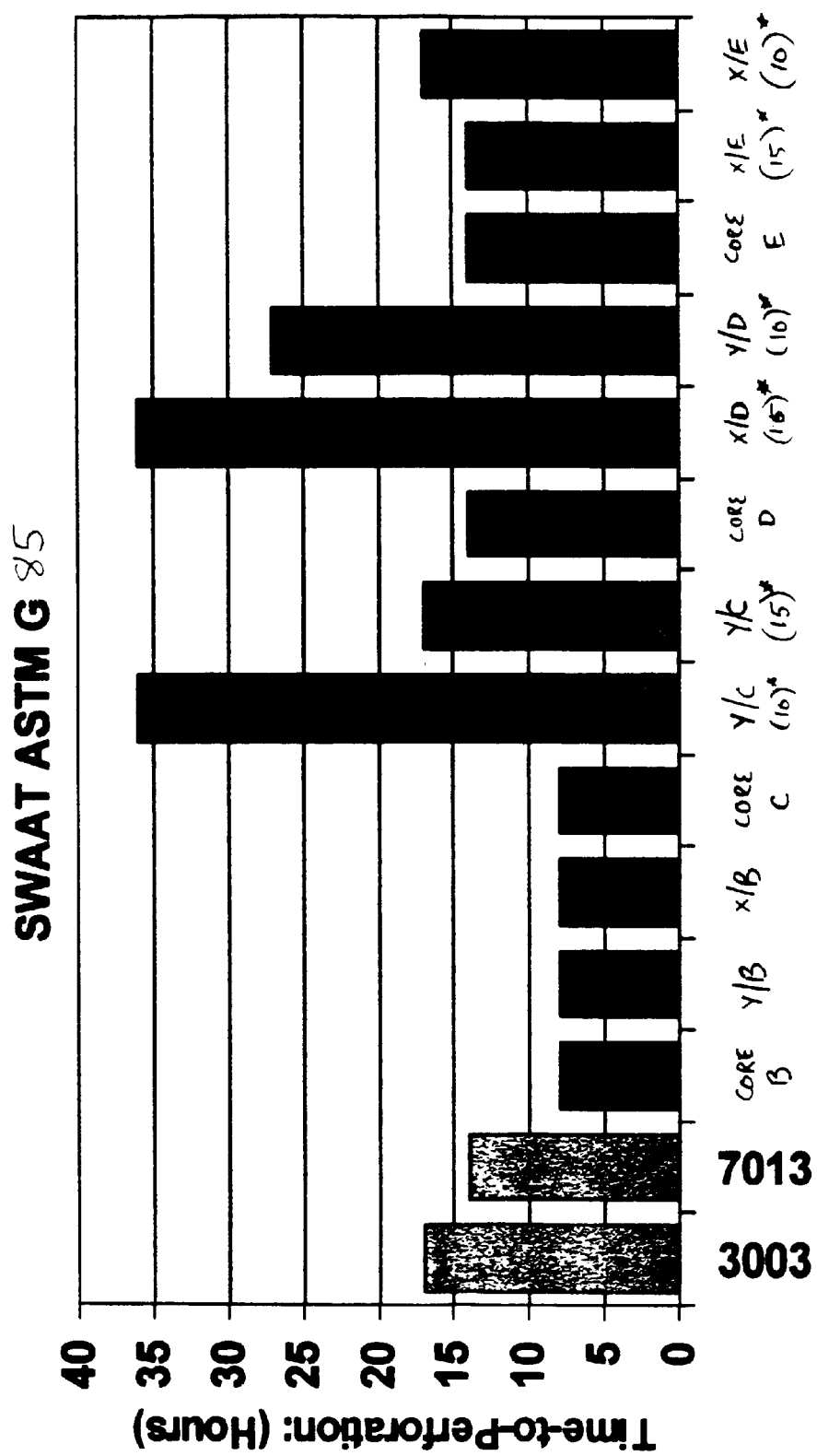
FIG. 5 is a graph comparing SWAAT corrosion test result for various materials.

However, significant corrosion resistance can be attained by controlling the potential of the cladding layer to be at least 20 mV more negative than the core material. Referring to FIG. 5, the SWAAT corrosion resistance times are plotted versus various materials, including bare core materials and composite materials, some according to the invention. The bare core materials AA3003, AA7013, and Cores B–E without cladding did not exhibit pronounced corrosion resistance. Composite materials Clad Y on Core C and Clad X and Y on Core D all exhibit pronounced corrosion resistance as compared to unclad Cores D or E. The composite materials according to the invention also exhibit vastly improved corrosion resistance compared to the prior art alloys AA3003 and AA7013.

The composite material is also beneficial in that exotic or special alloying elements and techniques are not required to produce an improved brazed article. In fact, standard alloys can be utilized based on electrical conductivity characteristics as both the core material and the cladding material for making the composite. Thus, the alloys can be manufactured more economically, such savings also reflecting reduced costs for the brazed article.

As such, an invention has been disclosed in terms of preferred embodiments thereof which fulfills each and every one of the objects of the present invention as set forth above and provides a new and improved aluminum alloy composite, a method of use in brazing applications, and a method of manufacture.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. An aluminum alloy composite comprising:
   a) a core layer having opposing core surfaces and being formed from a first aluminum alloy material, selected from of one of an AA3000 series, an AA6000 series, and an AA8000 series aluminum alloy, having less than 99% by weight of aluminum and more than 1% by weight of one or more metallic elements, the one or more metallic elements being in or out of solution and increasing the strength of the first aluminum alloy material such that the first aluminum alloy material has a tensile strength greater than 15 KSI, and having an electrical conductivity less than 50% IACS; and
   b) at least one cladding layer having opposing surfaces, one of the opposing surfaces adjacent one the opposing core surfaces, with at least a portion of the other opposing surfaces exposed for fusing with another aluminum component, the at least one cladding layer being formed of a second aluminum alloy material, selected from one of an AA1000 series and an AA7000 series aluminum alloy, having less than 1% by weight of the one more metallic elements such that the second aluminum alloy material has a tensile strength less than 15 KSI, having from zero to up to 2.5% by weight of other metallic elements that are in solution and increase corrosion potential negativity so that the corrosion potential of the second aluminum alloy material is at least 20 mV more negative than a corrosion potential of the first aluminum alloy of the core layer, and having an electrical conductivity of greater than 50% IACS.

2. The composite of claim 1, wherein the at least one cladding layer comprises two cladding layers, each cladding layer being adjacent a respective opposing surface of the core layer, each of the other opposing surfaces of the cladding layers being exposed for brazing.

3. The composite of claim 1, wherein the core material and the cladding layer are sheet materials.

4. The composite of claim 1, wherein the core material has a first thickness and the at least one cladding layer has a second thickness, a ratio of the second thickness to the combined first and second thicknesses ranging between about 5 and 40%.

5. The composite of claim 2, wherein the core material has a first thickness and the two cladding layers each have a second thickness, a ratio of each second thickness to the combined first and second thicknesses ranging between about 2.5 and 20%.

6. The composite of claim 1, wherein the core layer is an AA3000 series aluminum alloy and the at least one cladding layer is an AA1000 series aluminum alloy.

7. A method of forming a brazed article by brazing at least two aluminum alloy components together comprising:
   a) providing an aluminum alloy composite including:
      i) a core layer having opposing core surfaces and being formed from a first aluminum alloy material having less than 99% by weight of aluminum and more than 1% by weight of one or more metallic elements, the one or more metallic elements being in or out of solution and increasing the strength of the first aluminum alloy material such that the first aluminum alloy material has a tensile strength greater than 15 KSI, and having an electrical conductivity less than 50% IACS; and
      ii) at least one cladding layer having opposing surfaces, one of the opposing surfaces adjacent one the opposing core surfaces, with at least a portion of the other opposing surfaces exposed for fusing with another aluminum component, the at least one cladding layer being formed of a second aluminum alloy material having less than 1% by weight of the one more metallic elements such that the second aluminum alloy material has a tensile strength less than 15 KSI, having from zero to up to 2.5% by weight of other metallic elements that are in solution and increase corrosion potential negativity so that the corrosion potential of the second aluminum alloy material is at least 20 mV more negative than a corrosion potential of the first aluminum alloy material of the core layer, and having an electrical conductivity greater than 50% IACS;
   b) providing at least one braze clad aluminum alloy component; and
   c) brazing the at least one aluminum alloy component to the portion of the exposed opposing surface of the aluminum alloy composite to form the brazed article.

8. The method of claim 7, wherein the brazing step further comprises using a brazing flux and a controlled atmosphere.

9. The method of claim 7, wherein the aluminum alloy composite is a bare fin stock material for heat exchanger use and the braze clad aluminum alloy component is braze clad tubing.

10. The method of claim 7, wherein a pair of cladding layers are provided adjacent each opposing surface of the core layer and an aluminum alloy component is brazed to each of the exposed opposing surface of the cladding layer.

11. The method of claim 7, wherein the core layer is formed of one of an AA3000 series, an AA6000 series, and an AA8000 series aluminum alloy and the cladding layer is formed of one of an AA1000 series and an AA7000 series aluminum alloy.

12. The method of claim 10, wherein the core layer is formed of one of an AA3000 series, an AA6000 series, and an AA8000 series aluminum alloy and the cladding layer is formed of one of an AA1000 series and an AA7000 series aluminum alloy.

13. A method of making an aluminum alloy composite material comprising:
   a) providing a core layer having opposing core surfaces and being formed from a first aluminum alloy material, selected from one of an AA3000 series, and AA6000 series, and an AA8000 series aluminum alloy, having less than 99% by weight of aluminum and more than 1% by weight of one or more metallic elements, the one or more metallic elements being in or out of solution and increasing the strength of the first aluminum alloy material such that the first aluminum alloy material has a tensile strength greater than 15 KSI, and having an electrical conductivity less than 50% IACS;
   b) providing at least one cladding layer being formed of a second aluminum alloy material, selected from one of an AA1000 series and an AA7000 series aluminum alloy, having less than 1% by weight of the one more metallic elements such that the second aluminum alloy material has a tensile strength less than 15 KSI, having from zero to up to 2.5% by weight of other metallic elements that are in solution and increase corrosion potential negativity so that the corrosion potential of the second aluminum alloy material is at least 20 MV more negative than a corrosion potential of the first aluminum alloy material of the core layer; and having an electrical conductivity greater than 50% IACS; and c) layering the core material and the at least one cladding material to form the aluminum alloy composite having at least one cladding material layer adjacent a core material layer and at least a portion of the cladding layer exposed for brazing after the layering step.

14. The method of claim 13, wherein the core material comprises a first sheet and the at least one cladding material comprises a second sheet, the layering step comprising roll bonding the first and second sheets together to form the aluminum alloy composite material.

15. The method of claim 13, wherein the cladding material is in a solid or molten metal form, the layering step comprising depositing the cladding material onto the core material to form the aluminum alloy composite material.

16. The method of claim 15, wherein the depositing step comprises spraying.

17. A bare heat exchanger fin stock material comprising:

a) a core layer having opposing core surfaces and being formed from a first aluminum alloy material having less than 99% by weight of aluminum and more than 1% by weight of one or more metallic elements, the one or more metallic elements being in or out of solution and increasing the strength of the first aluminum alloy material such that the first aluminum alloy material has a tensile strength greater than 15 KSI, and having an electricalconductivity less than 50% IACS; and b) two cladding layers, each cladding layer being adjacent a respective opposing surface of the core layer, each of the other opposing surfaces of the cladding layers, being exposed for brazing, having opposing surfaces, one of the opposing surfaces adjacent one the opposing core surfaces, with at least a portion of the other opposing surfaces exposed for fusing with another aluminum component, the at least one cladding layer being formed of a second aluminum alloy material having less than 1% by weight of the one more metallic elements such that the second aluminum alloy material has a tensile strength less than 15 KSI, having from zero to up to 2.5% by weight of other metallic elements that are in solution and increase corrosion potential negativity so that the corrosion potential of the second aluminum alloy material is at least 20 MV more negative than a corrosion potential of the first aluminum alloy material of the core layer, and having an electrical conductivity greater than 50% IACS.

18. The bare fin stock of claim 17, wherein the core material has a first thickness and the cladding layers have a second thickness, a ratio of the second thickness to the combined first and second thickness ranging from about 2.5 to 20%.

19. In a heat exchanger comprising a plurality of braze clad aluminum alloy tubing with an aluminum alloy fin stock material brazed between adjacent braze clad tubing, the improvement comprising the aluminum alloy fin stock material being the bare heat exchanger fin stock material of claim 17.

20. An aluminum alloy composite comprising:

a) a core layer having opposing core surfaces and being formed from a first aluminum alloy material having less than 99% by weight of aluminum and more than 1% by weight of one or more metallic elements, the one or more metallic elements being in or out of solution and increasing the strength of the first aluminum alloy material such that the first aluminum alloy material has a tensile strength greater than 15 KSI, and having an electrical conductivity less than 50% IACS; and b) two cladding layers having opposing surfaces, one of the opposing surfaces adjacent one the opposing core surfaces, with at least a portion of the other opposing surfaces exposed for fusing with another aluminum component, wherein each cladding layer is adjacent to a respective opposing surface of the core layer, each of the other opposing surfaces of the cladding layers exposed for brazing, each cladding layer being formed of a second aluminum alloy material having less than 1% by weight of the one more metallic elements such that the second aluminum alloy material has a tensile strength less than 15 KSI, having from zero to up to 2.5% by weight of other metallic elements that are in solution and increase corrosion potential negativity so that the corrosion potential of the second aluminum alloy material is at least 20 mV more negative than a corrosion potential of the first aluminum alloy of the core layer, and having an electrical conductivity of greater than 50% IACS.

21. A method of making an aluminum alloy composite material comprising:

a) providing a core layer having opposing core surfaces and being formed from a first aluminum alloy material having less than 99% by weight of aluminum and more than 1% by weight of one or more metallic elements, the one or more metallic elements being in or out of solution and increasing the strength of the first aluminum alloy material such that the first aluminum alloy material has a tensile strength greater than 15 KSI, and having an electrical conductivity less than 50% IACS;

b) providing at least one cladding layer in solid or molten form, being formed of a second aluminum alloy material having less than 1% by weight of the one more metallic elements such that the second aluminum alloy material has a tensile strength less than 15 KSI, having from zero to up to 2.5% by weight of other metallic elements that are in solution and increase corrosion potential negativity so that the corrosion potential of the second aluminum alloy material is at least 20 MV more negative than a corrosion potential of the first aluminum alloy material of the core layer; and having an electrical conductivity greater than 50% IACS; and c) layering the core material and the at least one cladding material to form the aluminum alloy composite having at least one cladding material layer adjacent a core material layer and at least a portion of the cladding layer exposed for brazing after the layering step, wherein the cladding material is in a solid or molten form, the layering step comprising depositing the cladding material onto the core material.

* * * * *